United States Patent
Kato

(10) Patent No.: US 10,372,623 B2
(45) Date of Patent: Aug. 6, 2019

(54) STORAGE CONTROL APPARATUS, STORAGE SYSTEM AND METHOD OF CONTROLLING A CACHE MEMORY

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/923,477

(22) Filed: Mar. 16, 2018

(65) Prior Publication Data

US 2018/0276141 A1 Sep. 27, 2018

(30) Foreign Application Priority Data

Mar. 24, 2017 (JP) ................. 2017-059418

(51) Int. Cl.
| | |
|---|---|
| *G06F 12/00* | (2006.01) |
| *G06F 12/123* | (2016.01) |
| *G06F 12/0866* | (2016.01) |
| *G06F 12/0806* | (2016.01) |
| *G06F 12/0802* | (2016.01) |
| *G06F 12/0868* | (2016.01) |

(52) U.S. Cl.
CPC ........ *G06F 12/123* (2013.01); *G06F 12/0802* (2013.01); *G06F 12/0806* (2013.01); *G06F 12/0866* (2013.01); *G06F 12/0868* (2013.01); *G06F 2212/1016* (2013.01); *G06F 2212/312* (2013.01)

(58) Field of Classification Search
CPC .............. G06F 12/123; G06F 12/0868; G06F 12/0802; G06F 12/0806; G06F 12/0866; G06F 2212/1016; G06F 2212/312
See application file for complete search history.

(56) References Cited

U.S. PATENT DOCUMENTS

2007/0294475 A1    12/2007   Kobayashi et al.
2015/0278114 A1*  10/2015   Kumabe ............... G06F 12/122
                                                                  711/130

FOREIGN PATENT DOCUMENTS

| JP | 2007-334752 | 12/2007 |
| JP | 2015-191604 | 11/2015 |

* cited by examiner

*Primary Examiner* — Shawn X Gu
(74) *Attorney, Agent, or Firm* — Staas & Halsey LLP

(57) ABSTRACT

A storage control apparatus includes a cache memory, and a processor configured to access to a first area of the cache memory in accordance with a command, generate a first processing report identifying the first area, input the first processing report to a processing report queue when a plurality of second processing reports each of which identifies the first area are not stored in the processing report queue, execute management list update processing in which the access to the first area is recorded in a management list in accordance with the first processing report, identify data to be deleted from the cache memory in accordance with the management list, and not to input the first processing report to the processing report queue when the plurality of second processing reports are stored in the processing report queue.

20 Claims, 20 Drawing Sheets

FIG. 4

| PAGE | LUN | LBA |
|------|-----|-------|
| A | 10 | 4096 |
| D | 2 | 8192 |
| E | 6 | 12288 |
| ⋮ | ⋮ | ⋮ |

231

STORAGE CONTROL APPARATUS, STORAGE SYSTEM AND METHOD OF CONTROLLING A CACHE MEMORY

CROSS-REFERENCE TO RELATED APPLICATION

This application is based upon and claims the benefit of priority of the prior Japanese Patent Application No. 2017-59418, filed on Mar. 24, 2017, the entire contents of which are incorporated herein by reference.

FIELD

The embodiments discussed herein are related to a storage control apparatus, a storage system and a method of controlling a cache memory.

BACKGROUND

A storage system includes a storage device that stores data and a storage control apparatus that controls the storage device. The storage device is, for example, a non-volatile data storage device such as a hard disk drive (HDD) or a solid state drive (SSD). The storage control apparatus controls the storage device in response to a data write request or a data read request received from a host server and executes corresponding write processing of data into the storage device or read processing of data from the storage device. Hereinafter, a data write request is referred to as a "write command", and a data read request is referred to as a "read command". In addition, a write command and a read command are collectively referred to as a "command". In addition, input of a command to the storage control apparatus is referred to as an "access".

The storage control apparatus includes, for example, a dynamic random access memory (DRAM) as a cache memory. When the storage control apparatus has received a write command from the host server, the storage control apparatus stores data that is a target of the write command in the cache memory, and then, executes storage processing of the data stored in the cache memory into the storage device. In addition, in a case in which the storage control apparatus has received a read command from the host server, when data that is a target of the read command is stored in the cache memory, the storage control apparatus reads the data from the cache memory. The data that has been read from the cache memory is transmitted to the host server. When data that is a target of the read command is not stored in the cache memory, the storage control apparatus reads the data from the storage device. The data that has been read from the storage device is transmitted to the host server and also stored in the cache memory.

The capacity of the cache memory is smaller than the capacity of the storage device, thus, it is desirable that the storage control apparatus select a piece of data to be stored in the cache memory from among pieces of data stored in the storage device. In other words, the storage control apparatus executes processing in which a piece of data to be deleted is identified from among pieces of data stored in the cache memory in order to ensure the free capacity of the cache memory, and the identified data is deleted. As an algorithm for identifying data to be deleted from the cache memory, for example, a least recently used (LRU) scheme is known. In the LRU scheme, a management list is updated in accordance with the most recent access time to data stored in the cache memory, and a piece of data having the oldest most recent access time is preferentially deleted from the cache memory from among the pieces of data stored in the cache memory. The storage control apparatus executes processing in which the management list is updated in accordance with an access in order to manage the cache memory. Japanese Laid-open Patent Publication No. 2015-191604 and Japanese Laid-open Patent Publication No. 2007-334752 are related arts.

SUMMARY

According to an aspect of the invention, a storage control apparatus includes a cache memory, and a processor coupled to the cache memory and configured to execute a command processing including an access to a first area of the cache memory in accordance when a command is received from an information processing device, generate a first processing report that identifies the first area, input the first processing report to a processing report queue when a plurality of second processing reports each of which identifies the first area are not stored in the processing report queue, execute management list update processing in which the access to the first area is recorded in a management list in accordance with the first processing report input to the processing report queue, identify data to be deleted from the cache memory in accordance with the management list for which the management list update processing is executed, and execute at least one of a first processing in which the generated first processing report is not input to the processing report queue and a second processing in which at least one of the plurality of second processing reports are deleted from the processing report queue when the plurality of second processing reports are stored in the processing report queue.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a content example of a meta data list.

DESCRIPTION OF EMBODIMENTS

When there are two or more accesses to the storage control apparatus, a processor of the storage control apparatus executes update processing of a management list in response to each of the accesses, and thus a processing load of the processor increases.

First Embodiment

Figure 1:
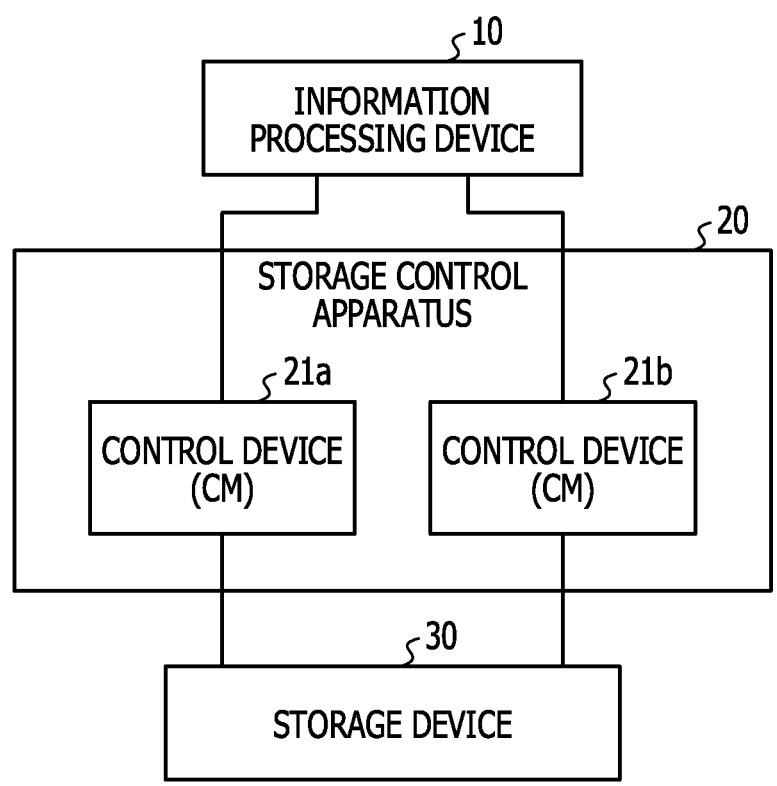
FIG. 1 is a diagram illustrating a storage system coupled to an information processing device.

FIG. 1 is a diagram illustrating a storage system coupled to an information processing device 10. The information processing device 10 is, for example, a host server. The storage system includes a storage control apparatus 20 and a storage device 30. The storage control apparatus 20 includes control devices 21a and 21b. The control devices 21a and 21b are coupled to each other through, for example, a PCI Express (registered trademark) bus, and transmit and receive pieces of data to and from each other. Each of the control devices 21a and 21b is referred to as a control manager (CM). Hereinafter, the CMs 21a and 21b are simply referred to as a "CM 21" when the CMs 21a and 21b are not distinguished. The CM 21 executes write processing of data into the storage device 30 or read processing of data from the storage device 30, in response to a command that has been transmitted from the information processing device 10. The storage device 30 is, for example, a non-volatile data storage device such as an HDD or an SSD.

Figure 2:
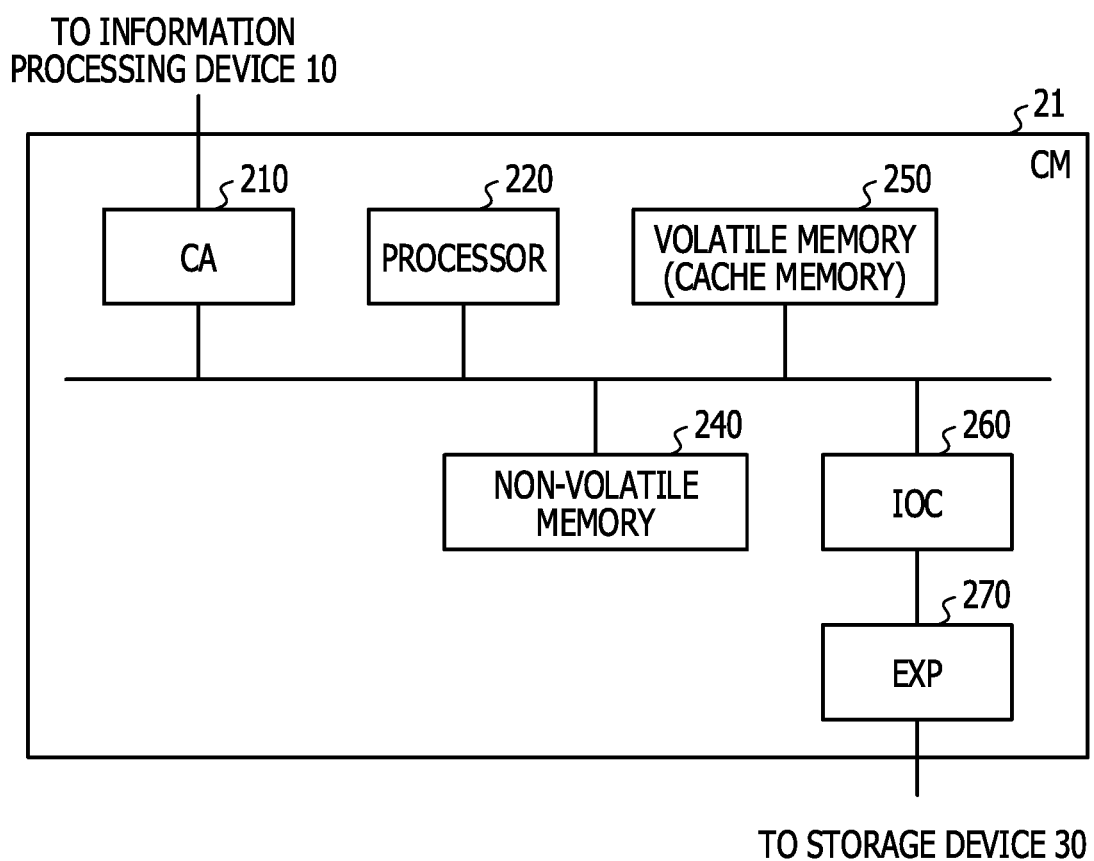
FIG. 2 is a diagram illustrating a hardware of a control manager (CM).

FIG. 2 is a diagram illustrating a hardware of the CM 21. The CM 21 includes a channel adaptor (CA) 210, a processor 220, a non-volatile memory 240, a volatile memory 250, an input output controller (IOC) 260, and an expander (EXP) 270.

The CA 210 is an interface circuit for the information processing device 10 and receives a command from the information processing device 10. In addition, data that has been read from the storage device 30 is transmitted to the information processing device 10 through the CA 210. In addition, a completion notification for a command that has been received from the information processing device 10 is transmitted to the information processing device 10 through the CA 210.

The processor 220 loads into the volatile memory 250 a computer program stored in the non-volatile memory 240 and executes the computer program. For example, the processor 220 executes write processing or read processing of data in response to reception of a command. The processor 220 is a hardware processor, and a central processing unit (CPU), a micro control unit (MCU), a micro processing unit (MPU), a digital signal processor (DSP), a field programmable gate array (FPGA), or the like may be applied to the processor 220.

The non-volatile memory 240 is a computer-readable recording medium. The non-volatile memory 240 stores a computer program or the like to be executed by the processor 220. The non-volatile memory 240 is, for example, a read only memory (ROM), a mask read only memory (mask ROM), a programmable read only memory (PROM), a flash memory, a magneto-resistive random access memory (MRAM), a resistance random access memory (ReRAM), a ferroelectric random access memory (FeRAM), or the like. The computer program may be recorded in a storage medium other than the non-volatile memory 240, which may be a computer-readable recording medium (excluding signal carrier). In addition, a portable recording medium such as a digital versatile disc (DVD) or a compact disc read only memory (CD-ROM), in which the computer program is recorded, may be distributed. In addition, the computer program may be transmitted via a network.

The volatile memory 250 is a computer-readable recording medium. Into the volatile memory 250, the computer program stored in the non-volatile memory 240 is loaded. In addition, the volatile memory 250 stores data used for calculation processing by the processor 220, data obtained as a result of the calculation processing, and the like. In addition, the volatile memory 250 is used as the above-described cache memory, and data that is to be a write target or data that is to be read target is stored in the cache memory when the CM 21 has received a command. The volatile memory 250 is, for example, a static random access memory (SRAM), a dynamic random access memory (DRAM), or the like.

The IOC 260 controls transmission and reception of pieces of data between the CM 21 and the storage device 30. The EXP 270 relays transmission and reception of pieces of data between the CM 21 and the storage device 30.

Figure 3:
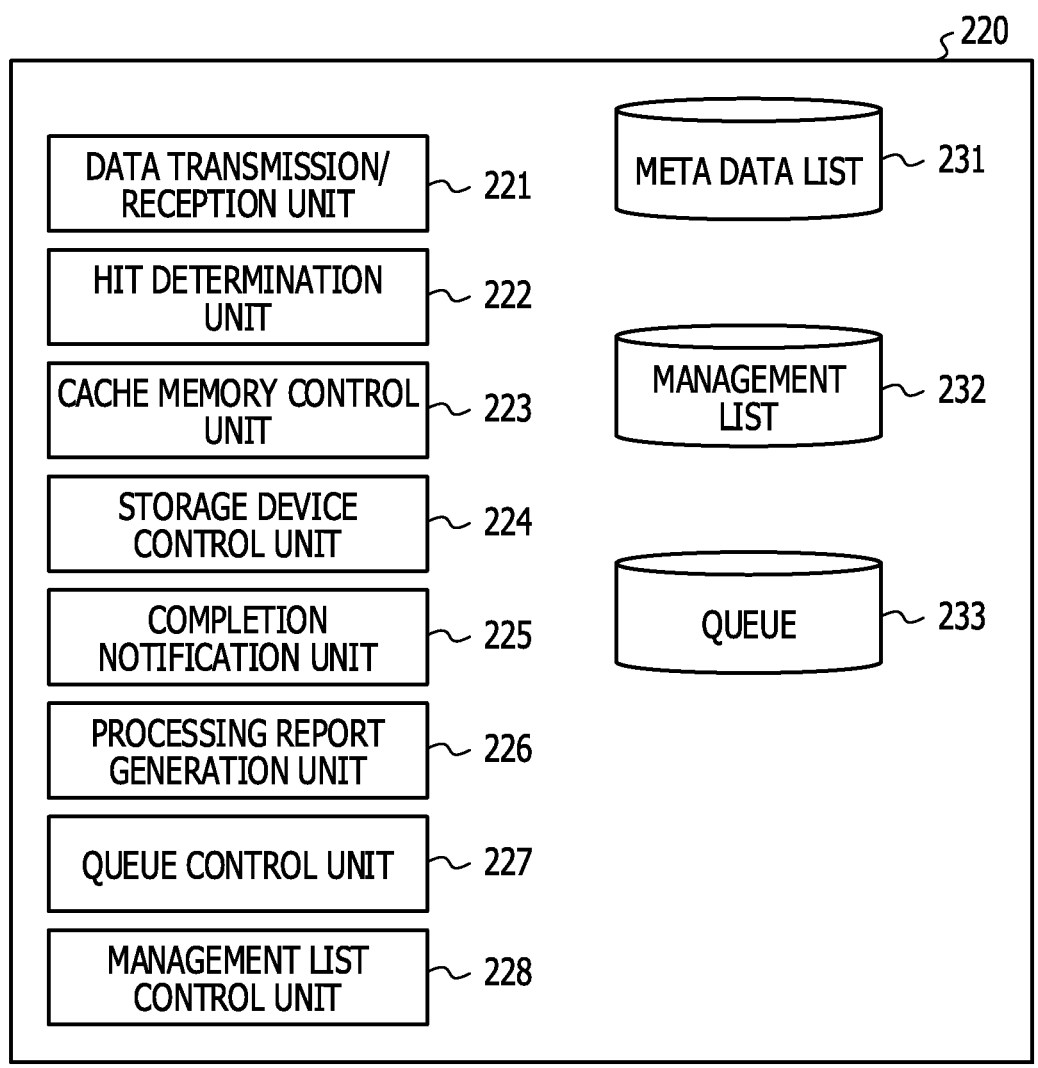
FIG. 3 is a diagram illustrating a functional block realized by a processor of the CM.

FIG. 3 is a diagram illustrating a functional block realized by the processor 220 of the CM 21. The processor 220 functions as a data transmission/reception unit 221, a hit determination unit 222, a cache memory control unit 223, a storage device control unit 224, a completion notification unit 225, a processing report generation unit 226, a queue control unit 227, and a management list control unit 228. In addition, the processor 220 includes a meta data list 231, a management list 232, and a queue 233. First, the meta data list 231 and the management list 232 are described.

The cache memory is managed in a unit of a page. One page is, for example, a storage area having the capacity of 4K bytes. In this case, for example, when the capacity of the cache memory is 64 G bytes, the cache memory includes 16M pages. The write processing of data into the cache memory or the read processing of data from the cache memory is executed in the unit of a page. Meta data indicating an address of data stored in each page is registered in the meta data list 231 so as to be associated with the page. The meta data includes, for example, a logical unit number (LUN) and a logical block address (LBA) of the data.

Figure 4:
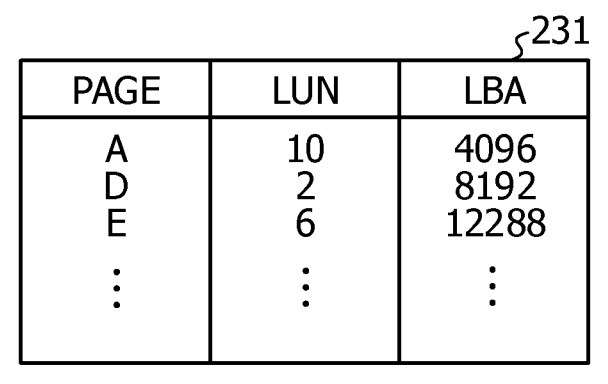

FIG. 4 is a diagram illustrating a content example of the meta data list 231. In FIG. 4, for example, meta data of a page A indicates that the LUN is 10, and the LBA is 4096. Here, it is indicated that data having 4K bytes is stored in the page A in accordance with information in which the LUN is 10 and the LBA is 4096. Similarly, it is indicated that data having 4K bytes is store in the page D in accordance with information in which the LUN is 2 and the LBA is 8192, and data having 4K bytes is store in the page E in accordance with information in which the LUN is 6 and the LBA is 12288.

Figure 5:
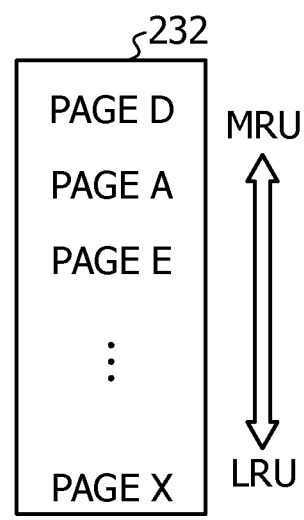
FIG. 5 is a diagram illustrating a content example of a management list.

FIG. 5 is a diagram illustrating a content example of the management list 232. In the management list 232, a page in which data is stored is registered, from among two or more pages included in the cache memory. In addition, in the management list 232, two or more pages each of which stores data are arranged in order based on the most recent access time to each of the corresponding pages. Specifically, the two or more pages are registered in the management list 232 in order from the newest most recent access time to the oldest most recent access time. In FIG. 5, the MRU is an abbreviation of most recently used, which indicates that the most recent access time for a corresponding page is newer than the other pages. In addition, the LRU is an abbreviation of least recently used, which indicates that the most recent access time for a corresponding page is older than the other pages. Therefore, when there is an access to a specific page, the management list control unit 228 updates the management list 232 such that the accessed page is arranged at the location of the MRU of the management list 232. In addition, when the cache memory control unit 223 deletes data of a page at the location of the LRU of the management list 232 in order to increase the free capacity of the cache memory.

The other functional block illustrated in FIG. 3 is described below. The data transmission/reception unit 221 receives a command and data that have been transmitted from the information processing device 10. In addition, the data transmission/reception unit 221 transmits, to the information processing device 10, data that has been read from the storage device 30 or the cache memory.

The hit determination unit 222 performs hit determination in accordance with the meta data list 231 when the data transmission/reception unit 221 has received a command. When the command is a read command, the hit determination unit 222 determines whether data having an address specified by the command is stored in the cache memory. In addition, when the command is a write command, the hit determination unit 222 determines whether data having an address specified by the command is stored in the cache memory or whether there is a free capacity (free page) in the cache memory.

The cache memory control unit 223 performs general control of the cache memory such as write processing of data into the cache memory or read processing of data from the cache memory. In addition, the cache memory control unit 223 deletes data from the cache memory in accordance with the management list 232 in order to ensure the free page of the cache memory.

The storage device control unit 224 performs general control of the storage device 30 such as write processing of data into the storage device 30 or read processing of data from the storage device 30. In this specification, the cache memory control unit 223 and the storage device control unit 224 may be collectively referred to as a "command processing unit".

The completion notification unit 225 transmits, to the information processing device 10, a completion notification indicating that processing for a command that had been transmitted from the information processing device 10 has been completed. For example, when the command is a write command, a completion notification is transmitted to the information processing device 10 after target data of the write command has been stored into the cache memory or the storage device 30. In addition, when the command is a read command, a completion notification is transmitted to the information processing device 10 after all of pieces of target data of the read command have been transmitted to the information processing device 10.

When the processing by the command processing unit has been executed, the processing report generation unit 226 generates a processing report indicating which page in the cache memory has been used. For example, when the command is a write command, and data that is a target of the write command has been stored into the page A, a processing report including information used to identify the page A is generated. In addition, when the command is a read command, and data that is a target of the read command is stored in the page A of the cache memory, a processing report including information used to identify the page A is generated, which is caused by execution of read processing of the data from the page A. In addition, when the command is a read command, and data that is a target of the read command is not stored in the cache memory, and the data that had been read from the storage device 30, which is the target of the read command, has been stored into the page A, a processing report including information used to identify the page A is generated.

The queue control unit 227 controls input of the processing report that has been generated by the processing report generation unit 226 to the queue 233. When a specific condition is satisfied for the generated processing report, the queue control unit 227 does not input the processing report to the queue 233 and deletes the processing report. In addition, when the specific condition is not satisfied, the queue control unit 227 inputs the processing report to the queue 233. The details of the specific condition and the queue 233 are described later.

The management list control unit 228 retrieves processing reports accumulated in the queue 233 in order and executes update processing of the management list 232. For example, when the processing report that that has been retrieved from the queue 233 is related to the page A, update processing of the management list 232 is executed such that the page A is arranged at the location of the MRU of the management list 232.

Figure 6:
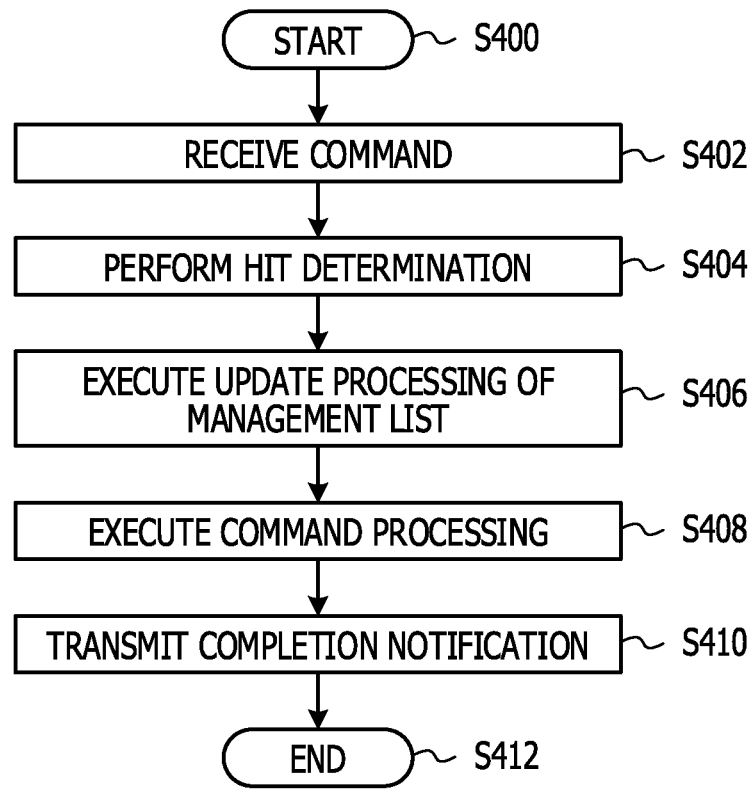
FIG. 6 is a flowchart illustrating an example of processing executed by the processor of the CM that has received a command.

FIG. 6 is a flowchart illustrating an example of processing executed by the processor 220 of the CM 21 that has received a command. The processing flow starts in processing S400, and in processing S402, the data transmission/reception unit 221 receives a command from the information processing device 10. In processing S404, the hit determination unit 222 performs hit determination for the received command. In addition, in processing S406, the management list control unit 228 executes update processing of the management list 232 depending on processing of the received command. After that, in processing S408, the processing corresponding to the received command, for example, write processing of data or read processing of data (hereinafter referred to as "command processing") is executed by the command processing unit. In addition, in processing S410, the completion notification unit 225 transmits, to the information processing device 10, a completion notification indicating that the command processing has been completed. After that, the processing flow ends in processing S412.

In the processing flow illustrated in FIG. 6, a large amount of commands may be quickly input to the CM 21. This is called IO concentration. When IO concentration occurs, the data transmission/reception unit 221 may execute pieces of command reception processing (processing S402) in parallel to some extent or the hit determination unit 222 may execute pieces of hit determination processing (processing S404) in parallel to some extent. In addition, the update processing of the management list 232 by the management list control unit 228 is controlled such that two or more pieces of update processing are not executed in parallel. This is why an error may occur in information that has been registered in the management list 232 when two or more pieces of update processing of the management list 232 are executed in parallel. Therefore, when a single piece of update processing is executed for the management list 232, control is performed such that locking occurs in another piece of update processing. Therefore, two or more pieces of update processing of the management list 232 are executed in order, and it may take a time for the two or more pieces of update processing.

Here, in FIG. 6, the command processing (processing S408) and the transmission processing of a completion notification (processing S410) are executed after the update processing of the management list 232 (processing S406). Therefore, when IO concentration has occurred, a delay occurs in the update processing of the management list 232, and a delay further occurs in the command processing and the transmission processing of a completion notification.

Figure 7:
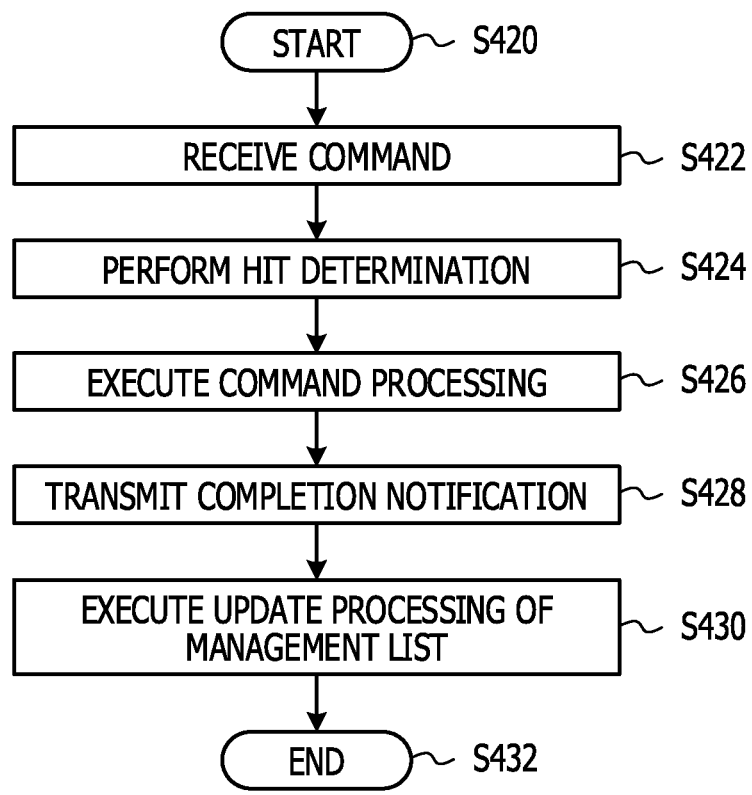
FIG. 7 is a flowchart illustrating another example of the processing executed by the processor of the CM that has received a command.

A processing flow to solve such a problem is described below. FIG. 7 is a flowchart illustrating another example of the processing executed by the processor 220 of the CM 21 that has received a command. The processing flow starts in processing S420, and in processing S422, the data transmission/reception unit 221 receives a command from the information processing device 10, and in processing S424, the hit determination unit 222 performs hit determination for the received command. The processing up to S424 the same as the processing flow illustrated in FIG. 6. Next, in processing S426, the command processing unit executes command processing. In addition, in processing S428, the completion notification unit 225 transmits, to the information processing device 10, a completion notification indicating that the command processing has been completed. After that, in processing S430, the management list control unit 228 updates the management list 232 depending on the command processing. After that, the processing flow ends in processing S432.

The processing flow illustrated in FIG. 7 is different from the processing flow illustrated in FIG. 6 in that the update processing of the management list 232 (processing S430) is executed later than the command processing (processing S426) and the transmission processing of a completion notification (processing S428). In the processing flow illustrated in FIG. 7, when IO concentration has occurred, a delay in the command processing and the transmission processing of a completion notification, which is caused by a delay in the update processing of the management list 232, may be resolved. In the processing flow illustrated in FIG. 7, the cache memory control unit 223 performs control such that a free capacity is continuously ensured in the cache memory.

Processing by the processing report generation unit 226 and the queue 233 when the processing flow illustrated in FIG. 7 is executed is described below. In the processing flow illustrated in FIG. 7, when IO concentration has occurred, two or more pieces of command processing are executed, and two or more pieces of update processing of the management list 232 respectively corresponding to the two or more pieces of command processing occurs after corresponding two or more completion notifications are transmitted to the information processing device 10. As described above, two or more pieces of reception processing respectively corresponding to two or more commands or two or more pieces of hit determination processing respectively corresponding to two or more commands are executed in parallel. In addition, two or more pieces of command processing respectively corresponding to two or more commands or two or more pieces of transmission processing of completion notifications corresponding to two or more commands may also be executed in parallel. However, two or more pieces of update processing of the management list 232 are not executed in parallel. Therefore, the processing report generation unit 226 generates a processing report corresponding to each command processing. The processing report includes information used to identify a used page of the cache memory for the command processing. In addition, the generated processing report is input to the queue 233. After that, the management list control unit 228 retrieves the processing reports accumulated in the queue 233 from the queue 233 in order and executes the update processing of the management list 232 in accordance with the retrieved processing report in order.

Figure 8:
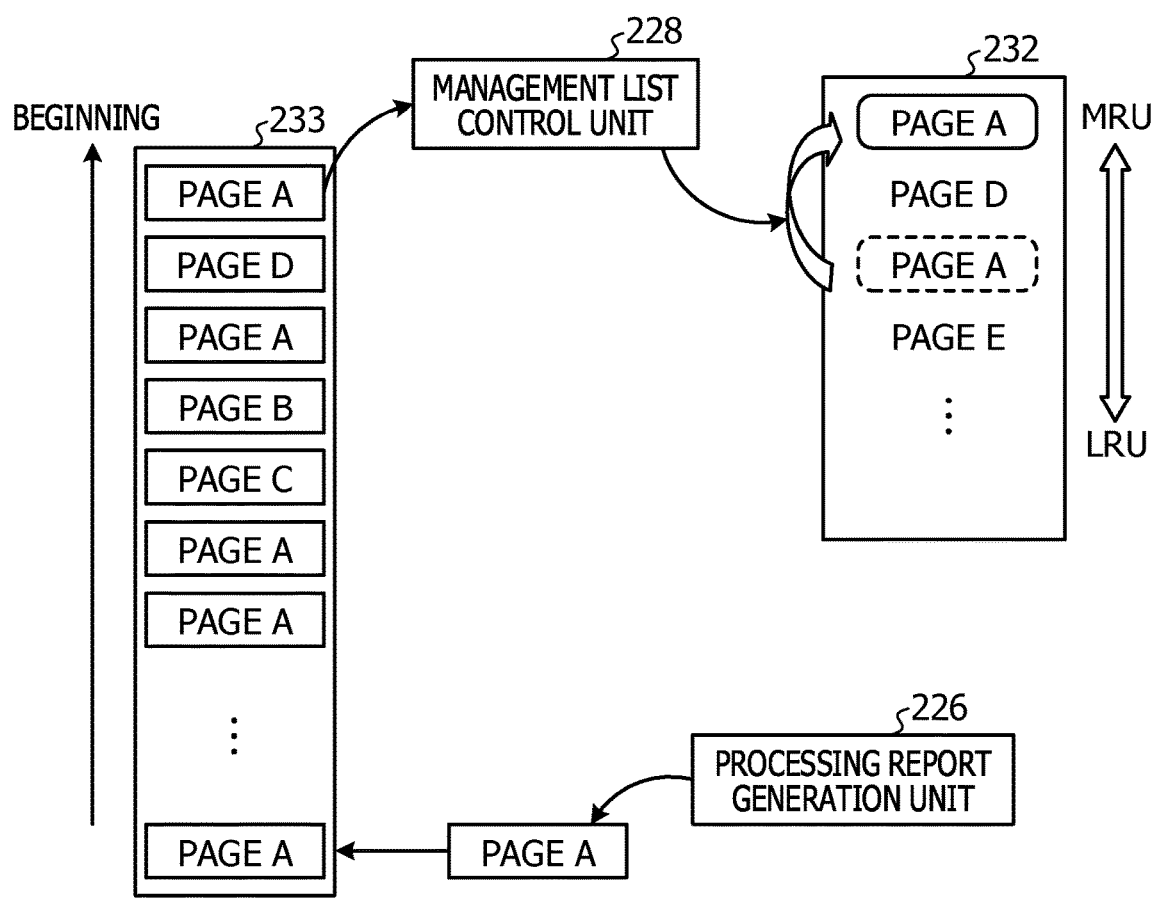
FIG. 8 is a diagram illustrating generation processing of a processing report by a processing report generation unit, input processing of a processing report to a queue, and update processing of a management list by a management list control unit.

FIG. 8 is a diagram illustrating generation processing of a processing report by the processing report generation unit 226, input processing of a processing report to the queue 233, and update processing of the management list 232 by the management list control unit 228. First, the processing report generation unit 226 generates a processing report, which is caused by execution of the command processing. The processing report that has been generated by the processing report generation unit 226, which is yet to input to the queue 233, is referred to as a "processing report PR". For example, when the command processing includes an access to the page A of the cache memory, a processing report PR including information used to identify the page A is generated.

The generated processing report PR is input to the end of the queue 233. In FIG. 8, the top of the queue 233 corresponds to the beginning of the queue 233, and the bottom of the queue 233 corresponds to end of the queue 233. In addition, it is assumed that the processing report accumulated in the queue 233 is referred to as a "processing report QR". The processing reports QR accumulated in the queue 233 are retrieved from the beginning of the queue 233 in order by the management list control unit 228. The management list control unit 228 executes the update processing of the management list 232 in accordance with the retrieved processing report QR. In FIG. 8, an example is illustrated in which the processing report QR that has been retrieved from the beginning of the queue 233 is related to the page A, and therefore, the page A is moved to the location of the MRU of the management list 232. The management list control unit 228 executes the retrieval processing of a processing report QR from the queue 233 and the update processing of the management list 232 in order.

When the page A is not registered in the management list 232 at a time point when a processing report QR related to the page A has been retrieved from the queue 233, the management list control unit 228 newly registers the page A at the location of the MRU of the management list 232.

A problem related to the processing of the management list control unit 228 when IO concentration has occurred is described below with reference to FIG. 8. When IO concentration has occurred, two or more accesses to a specific page may occur. In FIG. 8, two or more processing reports QR that have been generated by accesses to the page A are accumulated in the queue 233. In such a case, when the management list control unit 228 retrieves the processing reports QR from the queue 233 in order and executes the update processing of the management list 232, processing in which the page A is moved to the location of the MRU in the management list 232 is executed frequently and repeatedly. The processing in which the same page is repeatedly moved to the location of the MRU in the management list 232 increases a processing load of the processor 220.

In FIG. 8, the page A is moved to the location of the MRU in the management list 232 as a target page, but the update processing of the management list 232 may be processing in which an MRU pointer indicating the location of the MRU or an LRU pointer indicating the location of the LRU is moved.

Figure 9:
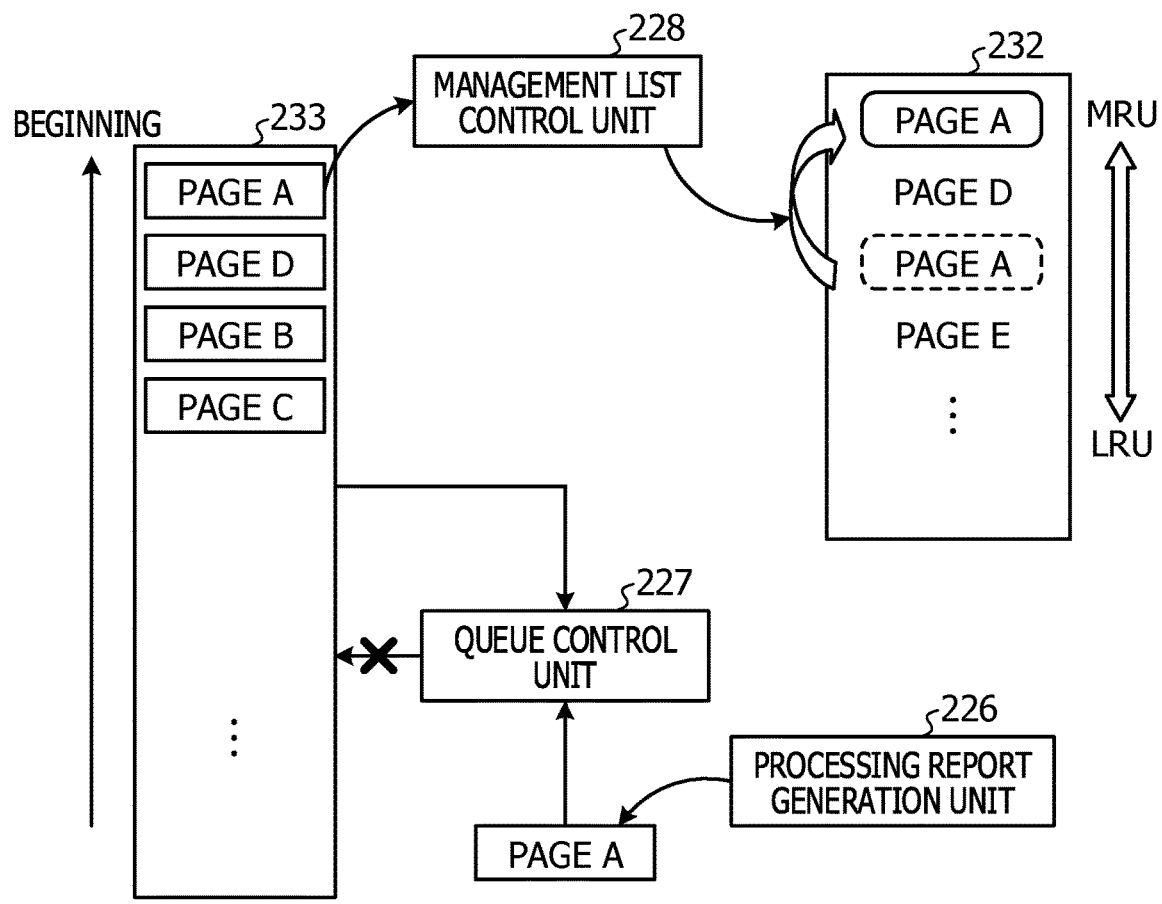
FIG. 9 is a diagram illustrating a function of a queue control unit.

A solution for the problem in which a processing load of the processor 220 is increased due to the processing in which the same page is repeatedly moved to the location of the MRU in the management list 232 is described below. FIG. 9 is a diagram illustrating a function of the queue control unit 227. Whether a processing report PR that has been generated by the processing report generation unit 226 is input to the queue 233 is determined by the queue control unit 227. When a specific condition is satisfied, the queue control unit 227 does not input the generated processing report PR to the queue 233. The specific condition is, for example, a condition in which a processing report QR related to the page A is already accumulated in the queue 233 when the processing report PR that has been generated by the processing report generation unit 226 is related to the page A. In FIG. 9, a processing report QR related to the page A is already accumulated in the queue 233. Therefore, the queue control unit 227 does not input the generated processing report PR related to the page A to the queue 233 and deletes the processing report PR. As a result, when two or more accesses to the page A occur, repetitive execution of the processing in which the page A is moved to the location of the MRU in the management list 232 is suppressed.

A concept of the example illustrated in FIG. 9 is described below. When at least n processing reports QR (n is a natural number) related to the same page as a page indicated by a generated processing report PR are stored in the queue 233, a generated processing report PR is not input to the queue 233. In this case, the number of processing reports QR that are stored in the queue 233 and each of which indicates the same page as the page indicated by the generated processing report PR is counted. In addition, the queue control unit 227 determines whether the processing report PR is input to the queue 233, in accordance with the counted number of processing reports QR. By such a method, accumulation of the processing reports QR related to the same page, the number of which exceeds n, in the queue 233 is suppressed.

As the value of "n", a value that has been specified by an administrator of the storage control apparatus 20 may be input to the storage control apparatus 20, or a value that has been set by the processor 220 may be used. For example, the processor 220 may measure a processing load of the processor 220 and the queue control unit 227 may define "n" in accordance with the measured processing load. For example, when the processing load of the processor 220 is a specific value or more, "n" is set at a first value, and when the processing load of the processor 220 becomes less than the specific value, "n" may be set at a second value which is larger than the first value.

In addition, the value of "n" may be set by considering the total capacity of the cache memory. For example, "n" when the total capacity of the cache memory is a first capacity may be set at a third value, and "n" when the total capacity of the cache memory is a second capacity that is smaller than the first capacity may be set at a fourth value which is larger than the third value. The third value may be the same value as the above-described first value.

Figure 10:
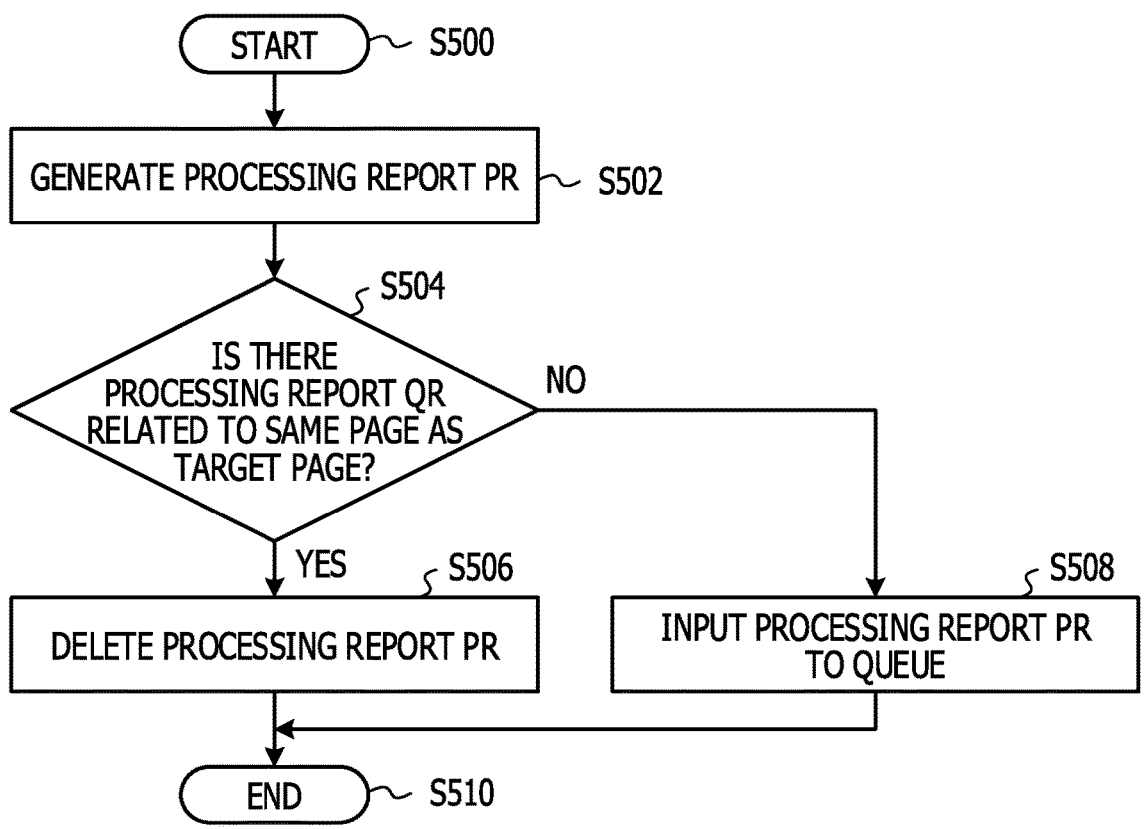
FIG. 10 is a flowchart illustrating an example of processing mainly related to input of a processing report to a queue, which is executed by a processor.

FIG. 10 is a flowchart illustrating an example of processing mainly related to input of a processing report PR to the queue 233, which is executed by the processor 220. When command processing is executed, the processing flow starts in processing S500, and in processing S502, the processing report generation unit 226 generates a processing report PR depending on the command processing. In processing S504, the queue control unit 227 determines whether there is a processing report QR related to the same page as a page indicated by the generated processing report PR (hereinafter referred to as a "target page") from among processing reports QR accumulated in the queue 233. When the queue control unit 227 determines that there is a processing report QR related to the same page as the target page, the processing flow proceeds to processing S506, and the queue control unit 227 determines that there is no processing report QR related to the same page as target page, the processing flow proceeds to processing S508. In processing S506, the queue control unit 227 deletes the generated processing report PR. Therefore, the processing report PR is not input to the queue 233. In addition, in processing S508, the queue control unit 227 inputs the generated processing report PR to the queue 233. In addition, the processing flow ends in processing S510.

Figure 11:
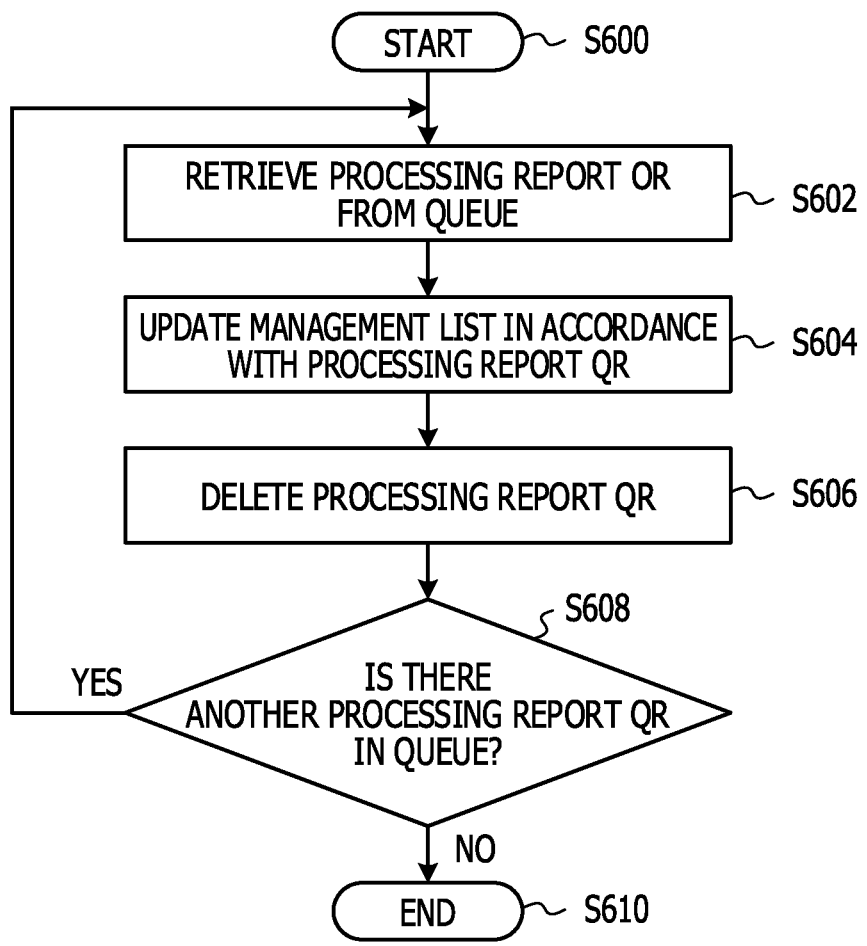
FIG. 11 is a flowchart illustrating an example of processing mainly related to update of the management list, which is executed by the processor.

FIG. 11 is a flowchart illustrating an example of processing mainly related to update of the management list 232, which is executed by the processor 220. The processing flow starts in processing S600, and in processing S602, the management list control unit 228 retrieves a processing report QR from the beginning of the queue 233. In addition, in processing S604, the management list control unit 228 executes the update processing of the management list 232 in accordance with the retrieved processing report QR. In addition, in processing S606, the management list control unit 228 deletes the processing report QR for which the update processing of the management list 232 has been executed. In addition, in processing S608, the management list control unit 228 determines whether another processing report QR is accumulated in the queue 233. When the management list control unit 228 determines that another processing report QR is accumulated in the queue 233, the processing flow returns to processing S602, and when the management list control unit 228 determines that another processing report QR is not accumulated in the queue 233, the processing flow proceeds to processing S610, and the processing flow ends in processing S610.

A modification of the processing related to input of a processing report PR to the queue 233 is described later. In FIGS. 9 and 10, the example is described in which a processing report QR is not input to the queue 233 and deleted when a target page is the same as a page indicated by a processing report QR already accumulated in the queue 233. In another example, not a processing report PR that has been generated by the processing report generation unit 226 but a processing report QR already accumulated in the queue 233 may be deleted from the queue 233. Even by such a method, repetitive execution of the update processing of the management list 232 for the same page is suppressed.

Figure 12:
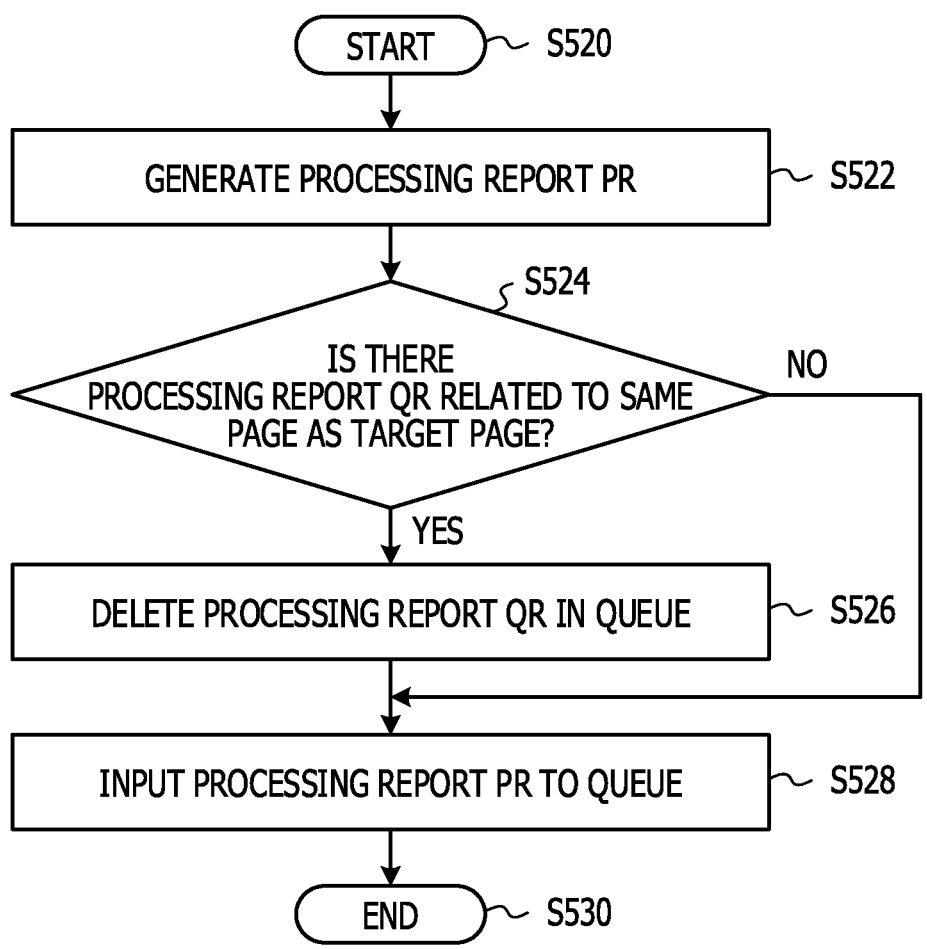
FIG. 12 is a flowchart illustrating another example of the processing mainly related to input of a processing report to a queue, which is executed by the processor.

FIG. 12 is a flowchart illustrating a modification of the processing mainly related to input of a processing report PR to the queue 233, which is executed by the processor 220. When command processing is executed, the processing flow starts in processing S520, and in processing S522, the processing report generation unit 226 generates a processing report PR depending on the command processing. In processing S524, the queue control unit 227 determines whether there is a processing report QR related to the same page as a target page in the queue 233. When the queue control unit 227 determines that there is a processing report QR related to the same page as the target page in the queue 233, the processing flow proceeds to processing S526, and when the queue control unit 227 determines that there is no processing report QR related to the same page as the target page in the queue 233, the processing flow proceeds to processing S528. In processing S526, the queue control unit 227 deletes the processing report QR from the queue 233. In processing S528, the queue control unit 227 inputs the generated processing report PR to the queue 233. In addition, the processing flow ends in processing S530.

In the example illustrated in FIG. 12, when there are two or more processing reports QR each of which is a deletion target, at least one of the processing reports QR, which has been selected by the queue control unit 227, is deleted.

Another modification of the processing related to input of a processing report to the queue 233 is described below. In the examples illustrated in FIGS. 9, 10, and 12, first, the processing report generation unit 226 generates a processing report PR, and the queue control unit 227 determines whether a processing report QR indicating the same page as a page indicated by the generated processing report PR is already accumulated in the queue 233. As another method, there is a method in which the processing report generation unit 226 does not generate a processing report PR related to the same page as a page indicated by a processing report QR already accumulated in the queue 233. Even by such a method, repetitive execution of the update processing of the management list 232 for the same page is suppressed.

Figure 13:
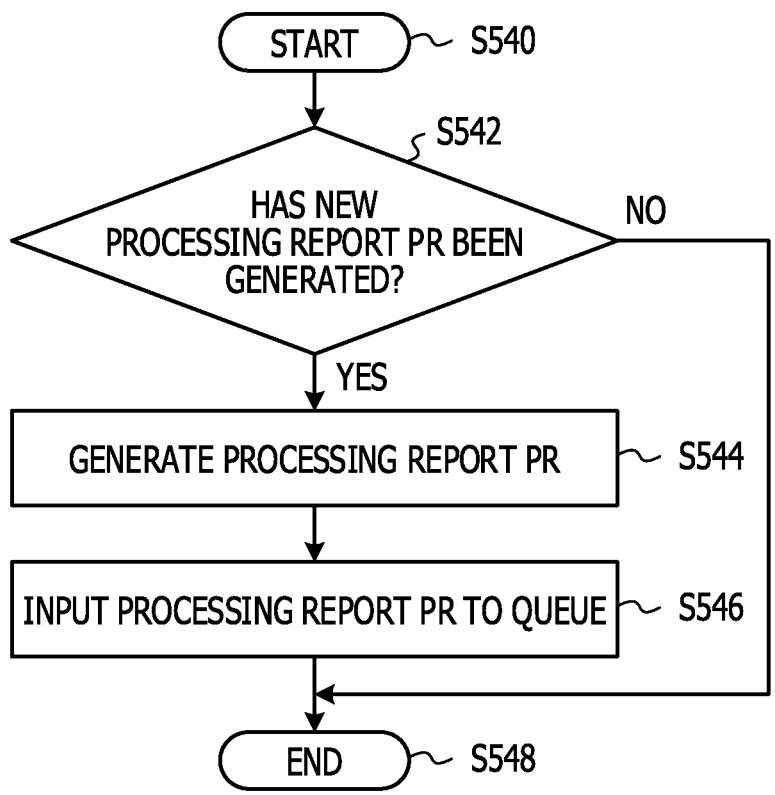
FIG. 13 is a flowchart illustrating a further example of the processing mainly related to input of a processing report to a queue, which is executed by the processor.

FIG. 13 is a flowchart illustrating another modification of the processing mainly related to input of a processing report to the queue 233, which is executed by the processor 220. When command processing is executed, the processing flow starts in processing S540, and in processing S542, the processing report generation unit 226 determines whether a processing report PR is newly generated by monitoring a processing report QR accumulated in the queue 233. Specifically, when it is assumed that a processing report PR is newly generated, the processing report generation unit 226 determines whether a page indicated by the newly-generated processing report PR becomes the same as a page indicated by a processing report QR accumulated in the queue 233 QR. When the page indicated by the newly-generated processing report PR becomes the same as the page indicated by the processing report QR accumulated in the queue 233, the processing report generation unit 226 determines that generation processing of the new processing report PR is not executed. In processing S542, when the processing report generation unit 226 determines that generation processing of a new processing report PR is executed, the processing flow proceeds to processing S544, and when the processing report generation unit 226 determines that generation processing of a new processing report PR is not executed, the processing flow proceeds to processing S548.

In processing S544, the processing report generation unit 226 generates a processing report PR, and in processing S546, the queue control unit 227 inputs the generated processing report PR to the queue 233. After that, in processing S548, the processing flow ends.

The processing flow related to control of the queue 233 and the management list 232, which is executed by the processor 220, is described above. A content of another processing executed by the processor 220 of the CM 21 is described below.

Figure 14:
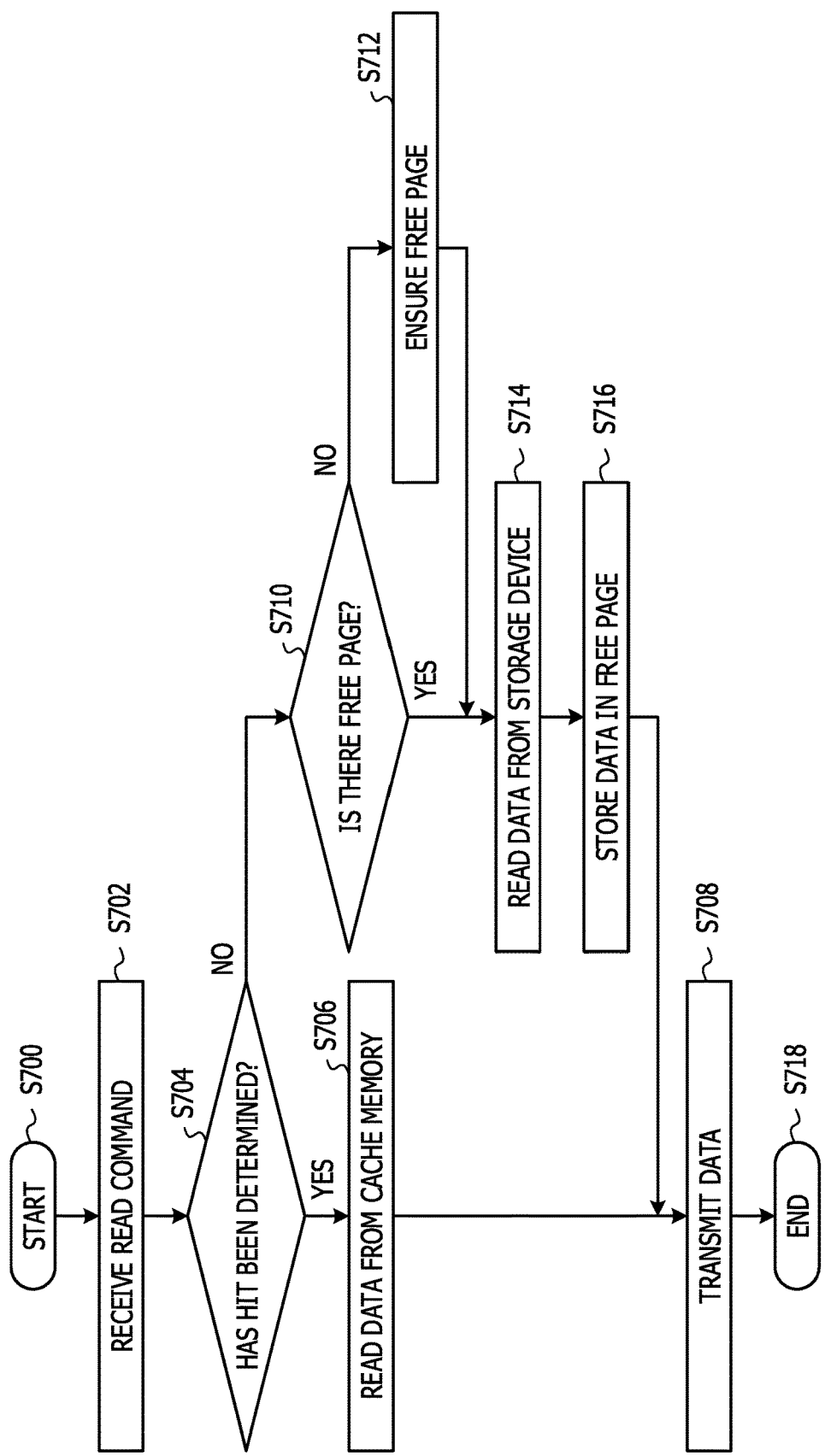
FIG. 14 is a flowchart illustrating an example related to read processing of data, which is executed in response to reception of a read command by the processor.

FIG. 14 is a flowchart illustrating an example related to read processing of data executed in response to reception of a read command, which is executed by the processor 220. The processing flow starts in processing S700, and in processing S702, the data transmission/reception unit 221 receives a read command. In processing S704, the hit determination unit 222 determines whether "hit" occurs in the cache memory for the received read command. When "hit" has been determined, the processing flow proceeds to processing S706, and when "hit" has not been determined, the processing flow proceeds to processing S710.

When the processing flow proceeds to processing S706, the cache memory control unit 223 executes read processing of data from the cache memory. In addition, in processing S708, the data transmission/reception unit 221 transmits the data (here, the data that has been read from the cache memory) to the information processing device 10 that is a transmission source of the read command.

In addition, when the processing flow proceeds to processing S710, the cache memory control unit 223 determines whether there is a free page in the cache memory. When the cache memory control unit 223 determines that there is a free page in the cache memory, the processing flow proceeds to processing S714, and when the cache memory control unit 223 determines that there is no free page in the cache memory, the processing flow proceeds to processing S712. In processing S712, the cache memory control unit 223 ensures a free page. Specifically, the cache memory control unit 223 ensures a free page by deleting data of a page at the location of the LRU in the management list 232.

In processing S714, the storage device control unit 224 executes read processing of data from the storage device 30. In addition, in processing S716, the cache memory control unit 223 stores the data that has been read from the storage device 30 in the free page. After that, in processing S708, the data transmission/reception unit 221 transmits the data (here, the data that has been read from the storage device 30) to the information processing device 10 that is a transmission source of the read command, and then, in processing S718, the processing flow ends.

Figure 15:
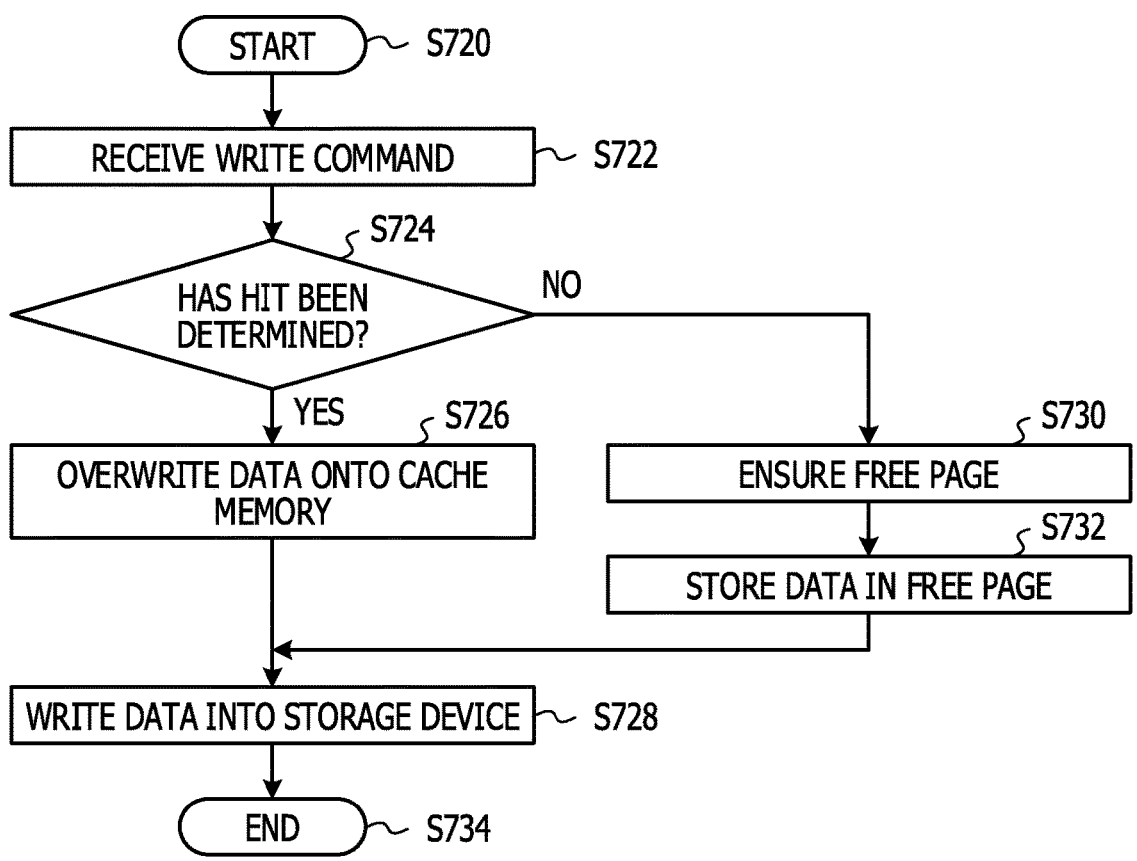
FIG. 15 is a flowchart illustrating an example related to write processing of data, which is executed in response to a write command by the processor.

FIG. 15 is a flowchart illustrating an example related to write processing of data executed in response to a write command, which is executed by the processor 220. The processing flow starts in processing S720, and in processing S722, the data transmission/reception unit 221 receives a write command. In processing S724, the hit determination unit 222 performs hit determination of the cache memory for the received write command, and when "hit" is determined, the processing flow proceeds to processing S726, and when "hit" is not determined, the processing flow proceeds to processing S730.

When the processing flow proceeds to processing S726, the cache memory control unit 223 overwrites data that is a write target on the cache memory. In addition, in processing S728, the storage device control unit 224 executes write processing of the data stored in the cache memory into the storage device 30.

In addition, when the processing flow proceeds to processing S730, the cache memory control unit 223 ensures a free space in the cache memory. Specifically, the cache memory control unit 223 ensures a free space by deleting data of a page at the location of the LRU in the management list 232. In addition, in processing S732, the cache memory control unit 223 stores the data in the ensured free page. In addition, in processing S728, the data has been written into the storage device 30, and then, in processing S734, the processing flow ends.

The first embodiment is described above. By the method according to the first embodiment, a processing load of the processor 220, which is desired for update of the management list 232, may be reduced. It is desirable that the list length of the management list 232 (the number of pages of the cache memory) is longer than the maximum length of the queue 233. In a case in which the list length of the management list 232 is longer than the maximum length of the queue 233, a probability may be suppressed in which data of a specific page is deleted from the cache memory when a processing report related to the page is not input to the queue and is deleted. In the first embodiment, the processing described as "processing in which a processing report PR is not input to the queue 233 and is deleted" includes "processing in which a processing report PR is deleted from the queue 233 after having been input to the queue 233 once".

Second Embodiment

In the first embodiment, whether a newly-generated processing report PR is input to the queue 233 is determined in accordance with a page indicated by a processing report QR accumulated in the queue 233. In addition, in the modification of the first embodiment, in accordance with a page indicated by a processing report QR accumulated in the queue 233, whether the processing report QR accumulated in the queue 233 is deleted or whether a new processing report PR is generated is determined. In the second embodiment, in accordance with information on a page registered in the management list 232, whether the generated processing report PR is input to the queue 233, whether the processing report QR accumulated in the queue 233 is deleted, or whether a processing report PR is generated is determined.

Figure 16:
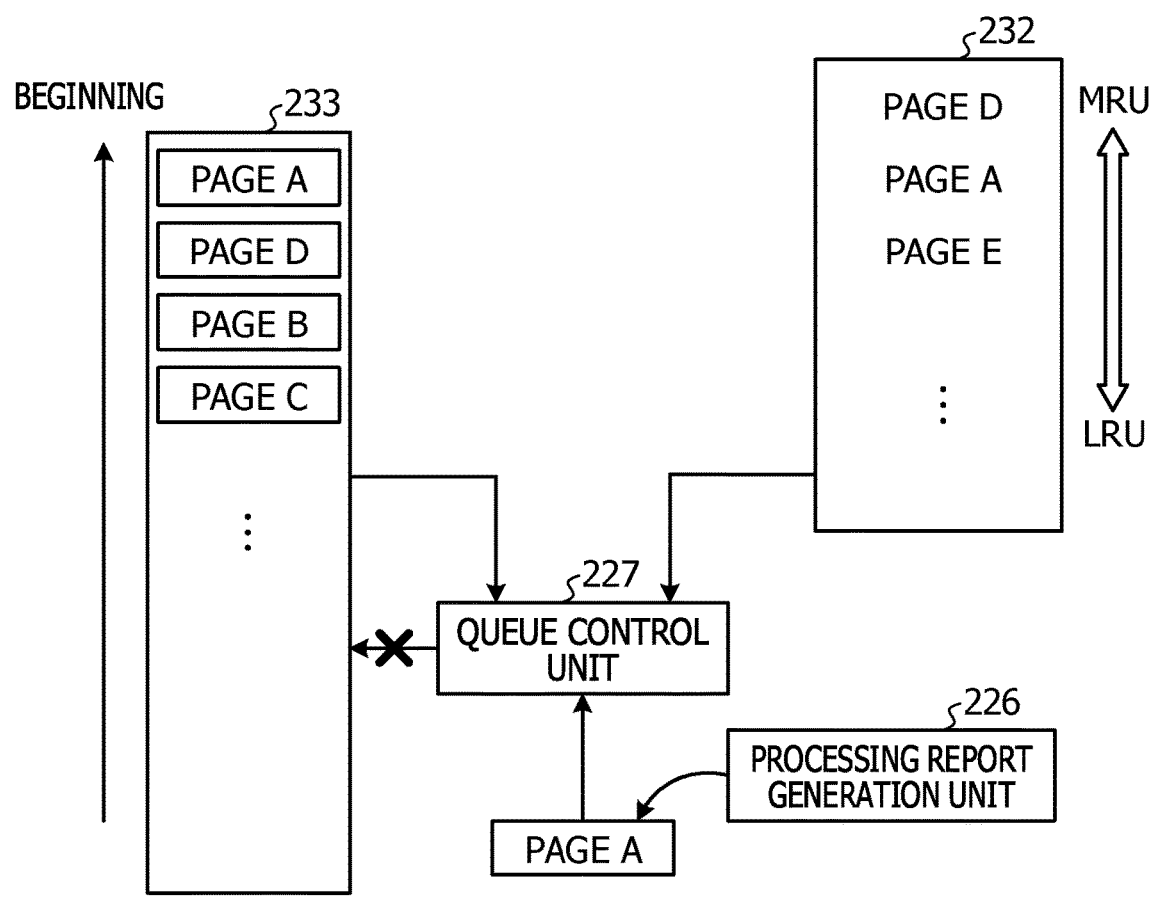
FIG. 16 is a diagram illustrating a function of a queue control unit according to a second embodiment.

FIG. 16 is a diagram illustrating a function of a queue control unit 227 according to the second embodiment. First, the processing report generation unit 226 generates a processing report PR. Here, similar to FIG. 9, it is assumed that a processing report PR including information indicating the page A is generated. The queue control unit 227 determines whether the generated processing report PR is input to the queue 233. At this time, the queue control unit 227 monitors a content of the management list 232 in addition to a content of the queue 233. In addition, the queue control unit 227 determines whether a processing report PR is not input to the queue 233 and is deleted or is input to the queue 233, in accordance with the content of the queue 233 and the content of the management list 232.

For example, when the page A is not registered in the management list 232, and two or more processing reports QR related to the page A are accumulated in the queue 233, the queue control unit 227 does not input the processing report PR related to the page A to the queue 233. When the page A is not registered in the management list 232, and a single processing report QR related to the page A is accumulated in the queue 233 or no processing report QR is accumulated in the queue 233, the queue control unit 227 inputs the processing report PR related to the page A to the queue 233.

In addition, when the page A is registered in the management list 232, and one or more processing reports QR related to the page A are accumulated in the queue 233, the queue control unit 227 does not input the processing report PR related to the page A to the queue 233. In addition, when the page A is registered in the management list 232, and no processing report QR related to the page A is accumulated in the queue 233, the queue control unit 227 inputs the processing report PR related to the page A to the queue 233.

Figure 17:
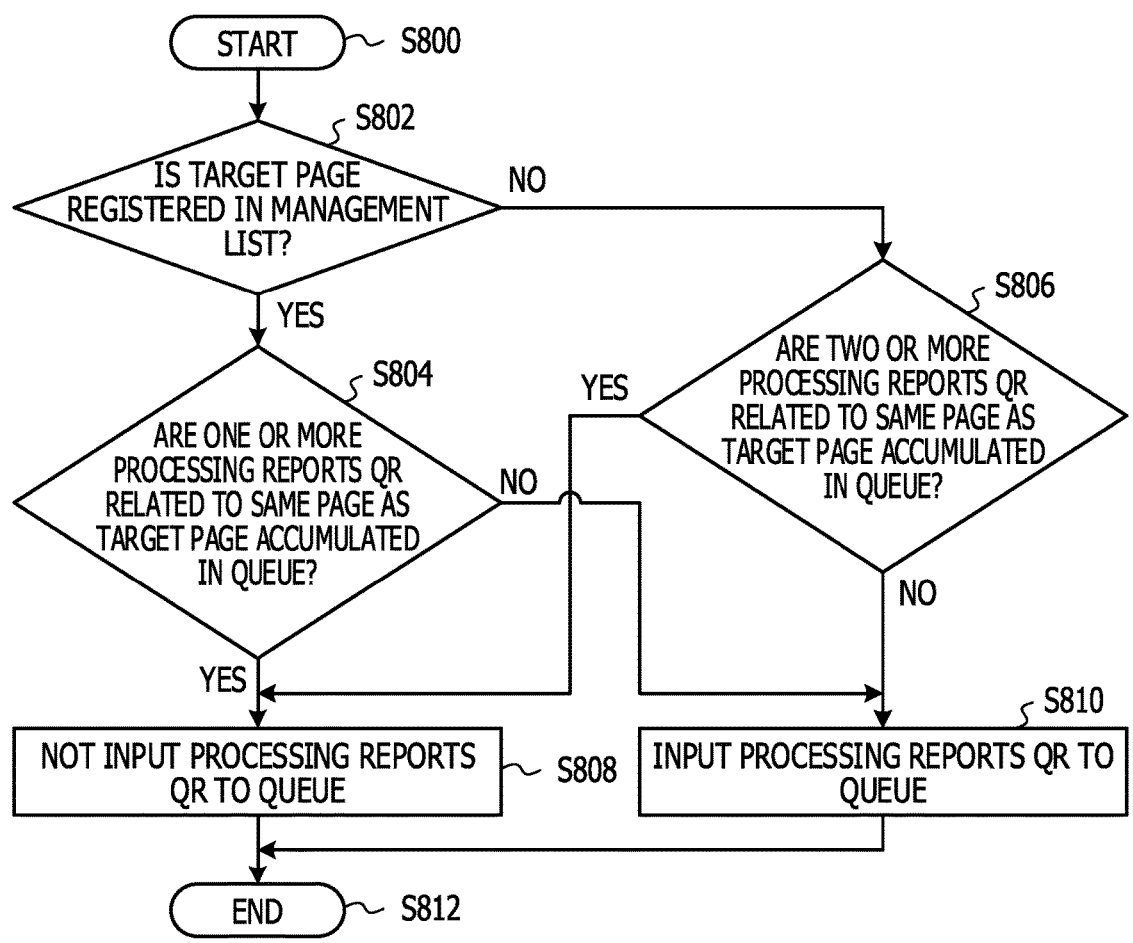
FIG. 17 is a flowchart illustrating processing executed by the queue control unit.

FIG. 17 is a flowchart illustrating processing executed by the queue control unit 227. The processing flow starts in processing S800, and in processing S802, the queue control unit 227 determines whether a target page is registered in the management list 232. When the queue control unit 227 determines that the target page is registered in the management list 232, the processing flow proceeds to processing S804, and when the queue control unit 227 determines that the target page is not registered in the management list 232, the processing flow proceeds to processing S806.

When the processing flow proceeds to processing S804, the queue control unit 227 determines whether one or more processing reports QR related to the same page as the target page are accumulated in the queue 233. When the queue control unit 227 determines that one or more processing reports QR related to the same page as the target page are accumulated in the queue 233, the processing flow proceeds to processing S808, and when the queue control unit 227 determines that one or more processing reports QR related to the same page as the target page are not accumulated in the queue 233, the processing flow proceeds to processing S810. In processing S808, the queue control unit 227 does not input the processing report PR to the queue 233. In addition, in processing S810, the queue control unit 227 inputs the processing report PR to the queue 233.

When the processing flow proceeds to processing S806, the queue control unit 227 determines whether two or more processing reports QR related to the same page as the target page are accumulated in the queue 233. When the queue control unit 227 determines that two or more processing reports QR related to the same page as the target page are accumulated in the queue 233, the processing flow proceeds to processing S808, and when the queue control unit 227 determines that two or more processing reports QR related to the same page as the target page are not accumulated in the queue 233, the processing flow proceeds to processing S810. In processing S808, the queue control unit 227 does not input the processing report PR to the queue 233. In addition, in processing S810, the queue control unit 227 inputs the processing report PR to the queue 233. After that, in processing S812, the processing flow ends.

A concept of the second embodiment is described below. When n processing reports QR related to the same page as a page indicated by a processing report PR that has been generated by the processing report generation unit 226 are already accumulated in the queue 233, the processing report PR is not input to the queue 233 and is deleted. In addition, "n" when the same page as the page indicated by the processing report PR that has been generated by the processing report generation unit 226 is registered in the management list 232 is set at a value lower than "n" when the same page is not registered in the management list 232.

For example, as a method in which whether the page A is registered in the management list 232 is determined, for example, there is a method using a flag. In such a method, at a time point at which the page A has been registered in the management list 232, a flag is generated that indicates the page A is registered in the management list 232, and at a time point at which the page A has been deleted from the management list 232, the flag is deleted. Depending on the presence or absence of such a flag, whether the page A is registered in the management list 232 is determined.

Figure 18:
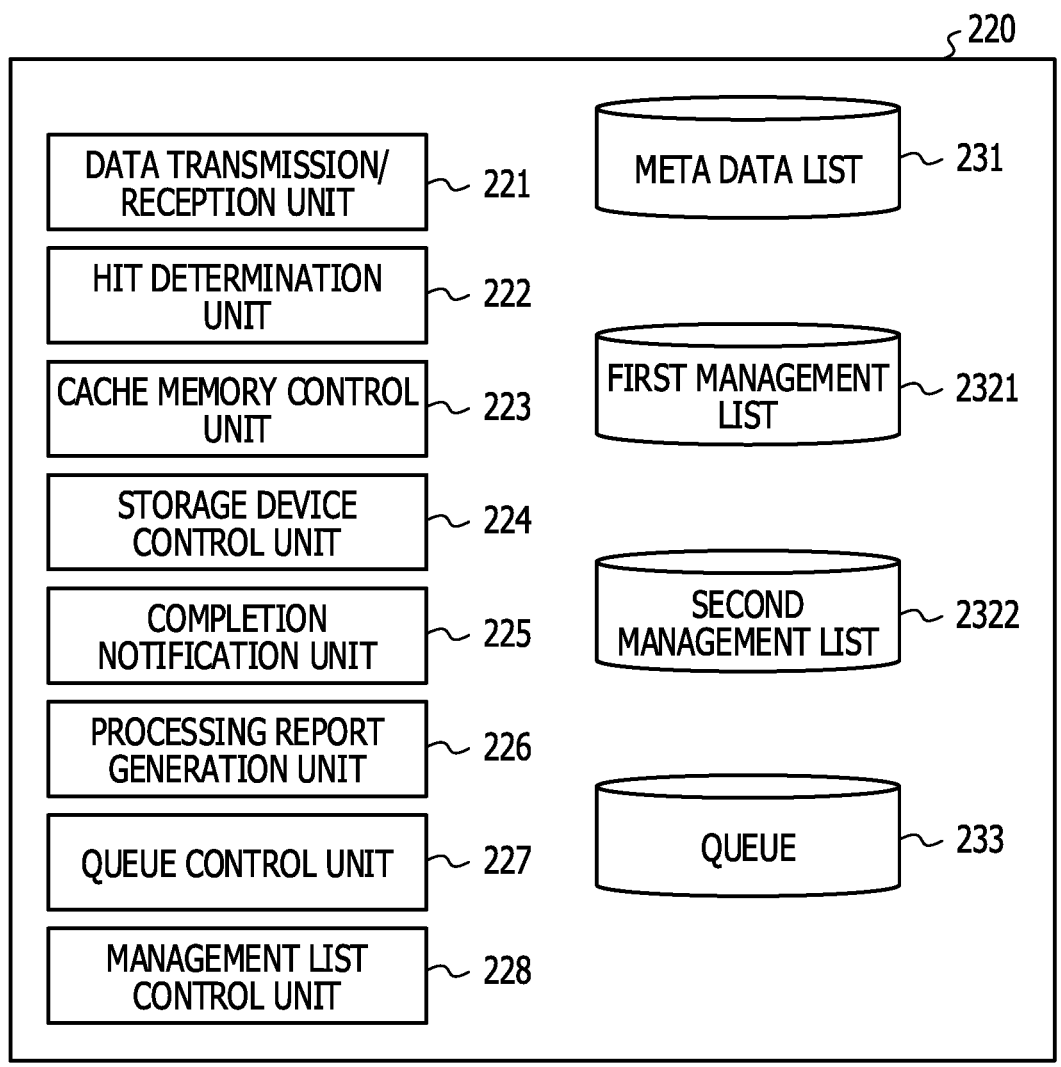
FIG. 18 is a diagram illustrating a functional block of a processor of a CM according to a modification of the second embodiment.

A modification of the second embodiment is described below. FIG. 18 is a diagram illustrating a functional block of the processor 220 according to a modification of the second embodiment. The same reference symbol is applied to the same functional block as the functional block illustrated in FIG. 3, and the description is omitted herein. The processor 220 includes a first management list 2321 and a second management list 2322. Hereinafter, the first management list 2321 and the second management list 2322 are simply referred to as a "management list 232" when the first management list 2321 and the second management list 2322 are not distinguished.

Figure 19:
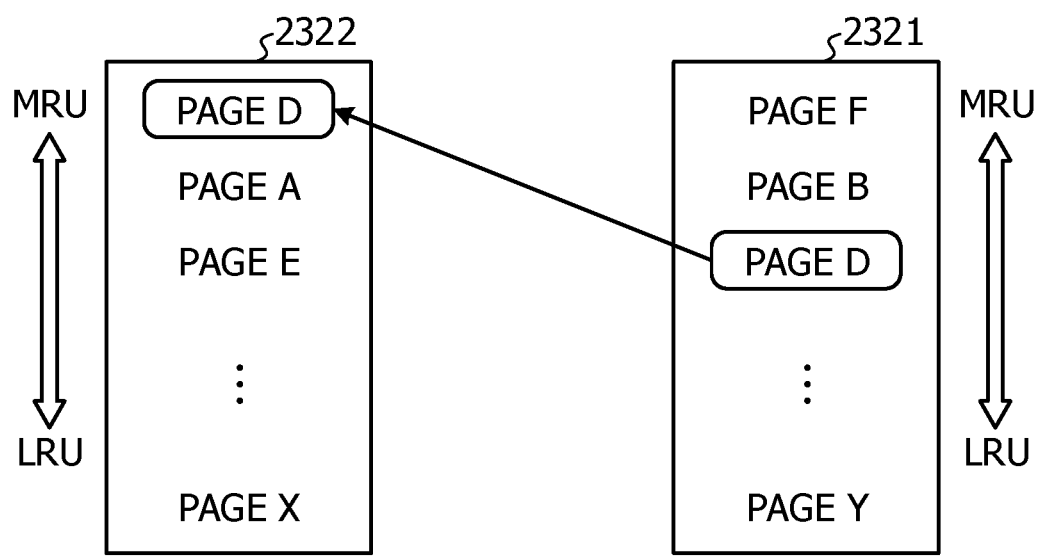
FIG. 19 is a diagram illustrating functions of a first management list and a second management list.

FIG. 19 is a diagram illustrating functions of the first management list 2321 and the second management list 2322. The first management list 2321 and the second management list 2322 are controlled by the LRU scheme. In a state in which a specific page of the cache memory is not registered in any one of the first management list 2321 and the second management list 2322, when there is an access to the page, the page is registered in the first management list 2321 first. After that, when there is another access to the page, that is, when "hit" has been determined for the page before the page is deleted from the first management list 2321, the page is moved to the second management list 2322. When there is a further access to the page before the page is deleted from the second management list 2322, the page is moved to the location of the MRU in the second management list 2322. That is, page management of the cache memory is performed by using the first management list 2321 in which a page to which a single access occurs is registered and the second management list 2322 in which a page to which two or more accesses occur is registered.

For example, even in sequential reading-out of a large amount of data such as sequential scan of the storage device 30, extrusion of data having high access frequency from the cache memory may be suppressed by using the two management lists 232 as described above.

Figure 20:
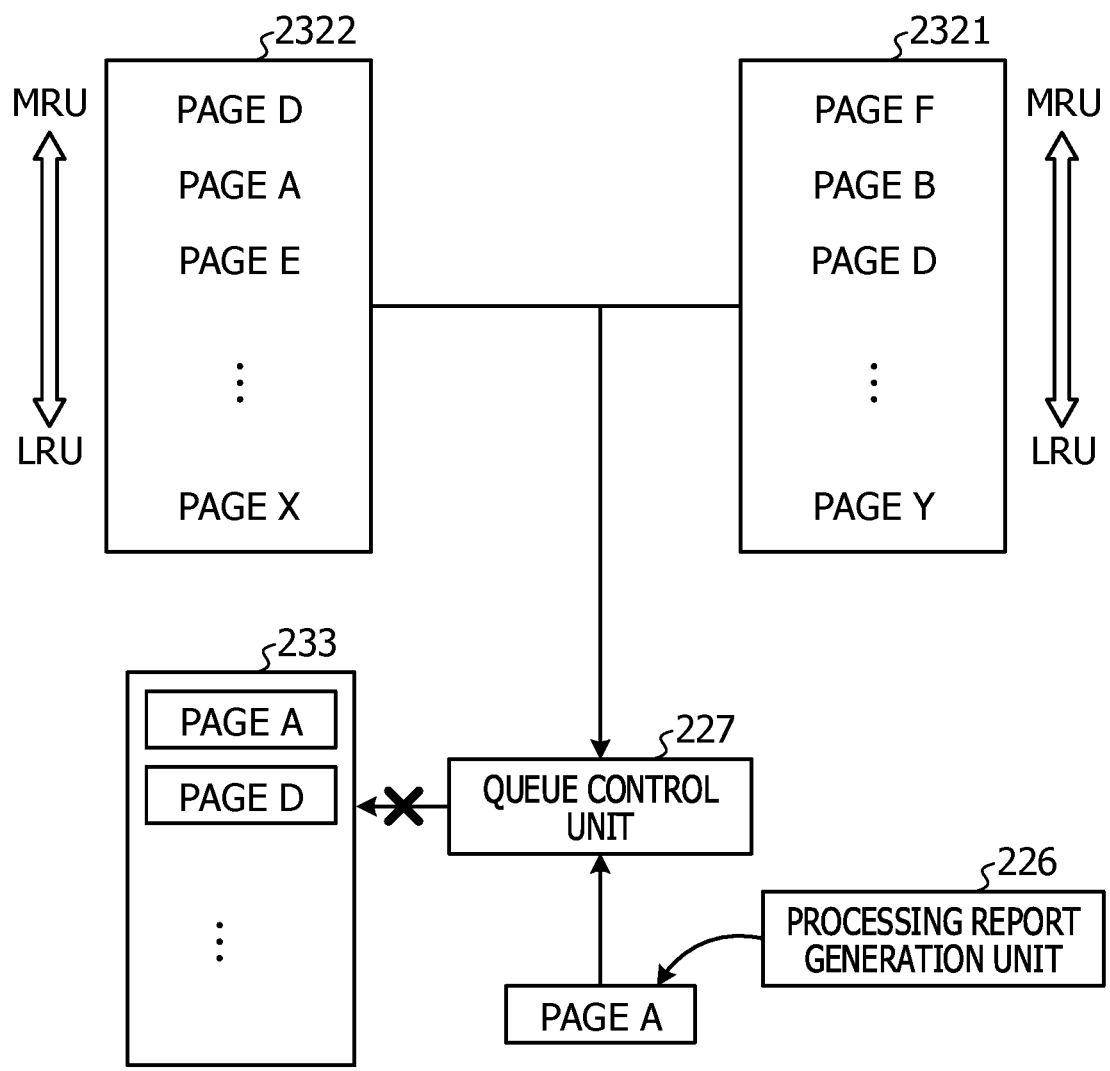
FIG. 20 is a diagram illustrating a function of the queue control unit when page management of a cache memory is performed by using the two management lists in the second embodiment.

The second embodiment may be applied to page management of the cache memory using the two management lists 232. FIG. 20 is a diagram illustrating a function of the queue control unit 227 when page management of the cache memory is performed by using the two management lists 232 in the second embodiment. First, it is assumed that the processing report generation unit 226 generates a processing report PR related to the page A. The queue control unit 227 determines the processing report PR is to be accumulated in the queue 233 by monitoring contents of the two management lists 232 first. When the page A is not registered in any one of the two management lists 232, the queue control unit 227 determines whether two or more processing reports QR related to the page A are accumulated in the queue 233. When two or more processing reports QR related to the page A are accumulated in the queue 233, the queue control unit 227 does not input the processing report PR to the queue 233 and deletes the processing report PR. In contrast, when a single processing report QR related to the page A or no processing report QR related to the page A is accumulated in the queue 233, the queue control unit 227 inputs the processing report PR to the queue 233.

In addition, when the page A is registered in one of the two management lists 232, the queue control unit 227 determines whether one or more processing reports QR related to the page A are accumulated in the queue 233. In addition, when one or more processing reports QR related to the page A are accumulated in the queue 233, the queue control unit 227 does not input the processing report PR to the queue 233 and deletes the processing report PR. In contrast, when any processing report QR related to the page A is not accumulated in the queue 233, the queue control unit 227 inputs the processing report PR to the queue 233.

A concept of the modification of the second embodiment is described below. When n processing reports QR related to the same page as a page indicated by a processing report PR that has been generated by the processing report generation unit 226 are already accumulated in the queue 233, the processing report PR is not input to the queue 233 and is deleted. In addition, "n" when the same page as the page indicated by the generated processing report PR is registered in one of the two management lists 232 is set at a value lower than "n" when the same page is not registered in any one of the two management lists 232.

In the modification of the second embodiment, a different n value may be set depending on whether the page indicated by the processing report PR is registered in the first management list 2321 or the second management list 2322. For example, when the page A indicated by the processing report PR is not registered in any one of the two management lists 232, and three or more processing reports QR each indicating the page A are accumulated in the queue 233, the processing report PR is not input to the queue 233. In contrast, when the number of processing reports QR related to the page A, which are accumulated in the queue 233, is two or less, the queue control unit 227 inputs the processing report PR to the queue 233.

In addition, when the page A is registered in the first management list 2321, and the number of processing reports QR related to the page A, which are accumulated in the queue 233, is two or more, the queue control unit 227 does not input the processing report PR to the queue 233 and deletes the processing report PR. In contrast, when the number of processing reports QR related to the page A, which are accumulated in the queue 233, is one or less, the queue control unit 227 inputs the processing report PR to the queue 233.

In addition, when the page A is registered in the second management list 2322, and the number of processing reports QR related to the page A, which are accumulated in the queue 233, is one or more, the queue control unit 227 does not input the processing report PR to the queue 233 and deletes the processing report PR. In contrast, when no processing report QR related to the page A is accumulated in the queue 233, the queue control unit 227 inputs the processing report PR to the queue 233.

In the modification of the second embodiment, the case is described above in which the number of management lists 232 is two, but the number of management lists 232 may be three or more. For example, an example is described below in which M management lists 232 (a first management list 2321, a second management list 2322, a third management list 2323, . . . , and an M-th management list 232M) are used. When the number of hits of an accessed page is zero, the page is registered in the first management list 2321, and when the number of hits is one or two, the page is registered in the second management list 2322, and when the number of hits is three to six, the page is registered in the third management list 2323. In addition, when the number of hits is $2^M-1$ or more, the page is registered in the M management list 232M. As described above, in a case in which the M management lists 232 are used, a queue management unit 227 obtains information indicating whether the page A is registered in one of the M management lists 232 and information indicating the number of processing reports QR related to the page A, which are accumulated in the queue 233. In addition, whether the processing report PR related to the page A is input to the queue 233 is determined, in accordance with the pieces of information. Alternatively, the queue management unit 227 obtains information indicating a management list 232 in which the page A is registered from among the M management lists 232 and information indicating the number of processing reports QR related to the page A, which are accumulated in the queue 233. In addition, whether the processing report PR related to the page A is input to the queue 233 may be determined, in accordance with the pieces of information. For example, when n processing reports QR each indicating the page A are accumulated in the queue 233, the queue management unit 227 does not input the processing report PR indicating the page A to the queue 233 and deletes the processing report PR. In addition, "n" when the page A is registered in the i-th management list 232$i$ may be set at a value higher than "n" when the page A is registered in the j-th management list 232$j$ (j>i).

The second embodiment and the modification of the second embodiment are described above. The number of management lists 232, the page management method by two or more management lists 232, and the setting method of a numeric value n in the second embodiment are examples, and those skilled in the art may appropriately change the examples.

In addition, similar to the modification of the first embodiment, even in the second embodiment and the modification of the second embodiment, processing in which a processing report QR accumulated in the queue 233 is deleted or processing in which a processing report PR is not generated may be executed instead of the processing in which a processing report PR is not input to the queue 233 and is deleted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
a cache memory; and
a processor coupled to the cache memory and configured to:
    execute a command processing including an access to a first area of the cache memory when a command is received from an information processing device,
    generate a first processing report that identifies the first area,
    input the first processing report to a processing report queue when a plurality of second processing reports each of which identifies the first area are not stored in the processing report queue,
    execute management list update processing in which the access to the first area is recorded in a management list in accordance with the first processing report input to the processing report queue,
    identify data to be deleted from the cache memory in accordance with the management list for which the management list update processing is executed, and
    execute at least one of a first processing in which the generated first processing report is not input to the processing report queue and a second processing in which at least one of the plurality of second processing reports are deleted from the processing report queue when the plurality of second processing reports are stored in the processing report queue.

2. The storage control apparatus according to claim 1, wherein
the processor is configured not to generate the first processing report when the plurality of second processing reports are stored in the processing report queue.

3. The storage control apparatus according to claim 2, wherein
the processor is configured to count a number of second processing reports when two or more second processing reports are stored in the processing report queue, and
when the number of second processing reports is a specific value or more, the first processing report is not generated.

4. The storage control apparatus according to claim 1, wherein
when a plurality of areas including the first area are registered in the management list, the management list update processing based on the first processing report is processing in which the management list is changed to indicate that a most recent access time to the first area is a latest time among most recent access times to the plurality of areas.

5. The storage control apparatus according to claim 4, wherein
the processor is configured to delete data stored in an area a most recent access time to which is an oldest time among most recent access times to the plurality of areas.

6. The storage control apparatus according to claim 4, wherein
the processor is configured to:
    read first data from the first area and transmit the read first data to the information processing device, when the command requests reading the first data, the first data being stored in the first area, and
    read the first data from a storage device, transmit the read first data to the information processing device, and store the first data in the first area of the cache memory, when the command requests reading the first data and when the first data is not stored in the cache memory including the first area.

7. The storage control apparatus according to claim 1, wherein
the processor is configured to store the first data in the first area when the command requests writing first data.

8. The storage control apparatus according to claim 1, wherein
the processor is configured to:

count a number of second processing reports when the two or more second processing reports are stored in the processing report queue and
when the number of second processing reports is a specific value or more, execute at least one of the first processing and the second processing.

9. The storage control apparatus according to claim 8, wherein
the processor is configured to specify a processing load of the storage control apparatus, the processing load being for the management list update processing, and
the specific value is a second value when the processing load is a first value, and
the specific value is a fourth value that is lower than the second value when the processing load is a third value that is greater than the first value.

10. The storage control apparatus according to claim 1, wherein
the processor is configured to determine whether to input the first processing report to the processing report queue or whether to delete at least one of the plurality of second processing reports from the processing report queue in accordance with first information indicating whether the first area is registered in the management list and second information indicating whether the plurality of second processing reports are stored in the processing report queue.

11. A storage system comprising:
a storage device; and
a storage control apparatus including a cache memory and a processor coupled to the cache memory, wherein
the processor is configured to:
execute a command processing including an access to the storage device and an access to a first area of the cache memory when a command is received from an information processing device,
generate a first processing report that identifies the first area,
input the first processing report to a processing report queue when a plurality of second processing reports each of which identifies the first area are not stored in the processing report queue,
execute management list update processing in which the access to the first area is recorded in a management list in accordance with the first processing report input to the processing report queue,
identify data to be deleted from the cache memory in accordance with the management list for which the management list update processing is executed, and
execute at least one of a first processing in which the generated first processing report is not input to the processing report queue and a second processing in which at least one of the plurality of second processing reports are deleted from the processing report queue when the plurality of second processing reports are stored in the processing report queue.

12. The storage system according to claim 11, wherein
the processor is configured not to generate the first processing report when the plurality of second processing reports are stored in the processing report queue.

13. The storage system according to claim 11, wherein
when a plurality of areas including the first area are registered in the management list, the management list update processing based on the first processing report is processing in which the management list is changed to indicate that a most recent access time to the first area is a latest time among most recent access times to the plurality of areas.

14. The storage system according to claim 13, wherein
the processor is configured to delete data stored in an area a most recent access time to which is an oldest time among most recent access times to the plurality of areas.

15. The storage system according to claim 13, wherein
the processor is configured to:
read first data from the first area and transmit the read first data to the information processing device, when the command requests reading the first data, the first data being stored in the first area, and
read the first data from a storage device, transmit the read first data to the information processing device, and store the first data in the first area of the cache memory, when the command requests reading the first data and when the first data is not stored in the cache memory including the first area.

16. The storage system according to claim 11, wherein
the processor is configured to store the first data in the first area when the command requests writing first data.

17. The storage system according to claim 11, wherein
the processor is configured to:
count a number of second processing reports when the two or more second processing reports are stored in the processing report queue and
when the number of second processing reports is a specific value or more, execute at least one of the first processing and the second processing.

18. A method of controlling a cache memory included in a storage control apparatus, the method comprising:
receiving a command from an information processing device;
in accordance with the received command, executing a command processing including an access to a storage device and an access to a first area of the cache memory;
generating a first processing report that identifies the first area;
inputting the first processing report to a processing report queue when a plurality of second processing reports each of which identifies the first area are not stored in the processing report queue;
executing management list update processing in which the access to the first area is recorded in a management list in accordance with the first processing report input to the processing report queue;
identifying data to be deleted from the cache memory in accordance with the management list for which the management list update processing is executed; and
executing at least one of a first processing in which the generated first processing report is not input to the processing report queue and a second processing in which at least one of the plurality of second processing reports are deleted from the processing report queue when the plurality of second processing reports are stored in the processing report queue.

19. The method according to claim 18, wherein
the first processing report is not generated when the plurality of second processing reports are stored in the processing report queue.

20. The method according to claim 18, wherein
when a plurality of areas including the first area are registered in the management list, the management list update processing based on the first processing report is processing in which the management list is changed to indicate that a most recent access time to the first area is a latest time among most recent access times to the plurality of areas.

* * * * *